(12) United States Patent
Cihlar et al.

(10) Patent No.: US 8,925,326 B2
(45) Date of Patent: Jan. 6, 2015

(54) SYSTEM AND METHOD FOR TURBINE COMBUSTOR MOUNTING ASSEMBLY

(75) Inventors: David William Cihlar, Greenville, SC (US); Patrick Benedict Melton, Horse Shoe, NC (US); Robert Joseph Rohrssen, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 830 days.

(21) Appl. No.: 13/115,009

(22) Filed: May 24, 2011

(65) Prior Publication Data

US 2012/0297782 A1    Nov. 29, 2012

(51) Int. Cl.
| | | |
|---|---|---|
| *F02C 1/00* | (2006.01) | |
| *F02G 3/00* | (2006.01) | |
| *F23R 3/60* | (2006.01) | |
| *F23R 3/00* | (2006.01) | |

(52) U.S. Cl.
CPC . *F23R 3/60* (2013.01); *F23R 3/002* (2013.01); *F23D 2900/14004* (2013.01); *F23R 2900/03043* (2013.01); *Y02T 50/675* (2013.01)
USPC .......... 60/752; 60/797; 60/798; 60/755; 60/756; 60/757; 60/758; 60/760; 60/796; 60/799; 60/800

(58) Field of Classification Search
USPC ................... 60/752–760, 796–800
See application file for complete search history.

(56) References Cited

U.S. PATENT DOCUMENTS

| | | |
|---|---|---|
| 2,621,477 A | 12/1952 | Powter et al. |
| 2,722,803 A | 11/1955 | Travers |
| 2,818,704 A | 1/1958 | Karcher |
| 2,958,194 A | 11/1960 | Bayley |
| 2,993,337 A | 6/1961 | Cheeseman |
| 3,099,134 A | 7/1963 | Calder et al. |
| 4,225,300 A | 9/1980 | Latter |
| 4,244,330 A | 1/1981 | Baugh et al. |
| 4,381,717 A | 5/1983 | Krautz |

(Continued)

FOREIGN PATENT DOCUMENTS

| | | |
|---|---|---|
| DE | 102008002981 A1 | 2/2009 |
| GB | 470940 A | 8/1937 |
| JP | 59009431 A | 1/1984 |

OTHER PUBLICATIONS

U.S. Appl. No. 13/115,018, filed May 24, 2011, Melton et al.

(Continued)

*Primary Examiner* — Craig Kim (74) *Attorney, Agent, or Firm* — Fletcher Yoder P.C.

(57) ABSTRACT

A system includes a gas turbine combustor, which includes a combustion liner disposed about a combustion region, a flow sleeve disposed about the combustion liner, an air passage between the combustion liner and the flow sleeve, and an aerodynamic mounting assembly disposed in the air passage. The aerodynamic mounting assembly is configured to retain the combustion liner within the flow sleeve. The aerodynamic mounting assembly includes a flow sleeve mount coupled to the flow sleeve and a liner stop coupled to the combustion liner. The flow sleeve mount includes a first portion of an aerodynamic shape and the liner stop includes a second portion of the aerodynamic shape, which is configured to direct an airflow into a wake region downstream of the aerodynamic mounting assembly. The flow sleeve mount and the liner stop couple with one another to define the aerodynamic shape.

20 Claims, 7 Drawing Sheets

(56) References Cited

U.S. PATENT DOCUMENTS

| | | | |
|---|---|---|---|
| 4,385,595 A | 5/1983 | Shaw | |
| 4,413,597 A | 11/1983 | Stang et al. | |
| 4,440,118 A | 4/1984 | Stang et al. | |
| 4,562,799 A | 1/1986 | Woods et al. | |
| 5,323,600 A | 6/1994 | Munshi | |
| 5,647,215 A | 7/1997 | Foss et al. | |
| 5,749,218 A | 5/1998 | Cromer et al. | |
| 5,979,374 A | 11/1999 | Jackson | |
| 6,004,070 A | 12/1999 | Van Camp | |
| 6,192,688 B1 | 2/2001 | Beebe | |
| 6,216,442 B1 | 4/2001 | Belsom et al. | |
| 6,279,313 B1 | 8/2001 | Lawen, Jr. et al. | |
| 6,334,294 B1 | 1/2002 | Belsom et al. | |
| 6,868,676 B1 | 3/2005 | Haynes | |
| 7,762,075 B2 * | 7/2010 | Pangle et al. | 60/752 |
| 7,886,541 B2 | 2/2011 | Woolford et al. | |
| 8,220,246 B2 | 7/2012 | Widener | |
| 8,276,391 B2 | 10/2012 | Berry et al. | |
| 2007/0062198 A1 | 3/2007 | Huth et al. | |
| 2008/0034759 A1 | 2/2008 | Bulman et al. | |
| 2009/0223228 A1 | 9/2009 | Romoser | |
| 2010/0037620 A1 | 2/2010 | Chila | |
| 2011/0016869 A1 | 1/2011 | Iwasaki | |
| 2011/0023494 A1 | 2/2011 | Butler et al. | |
| 2012/0036857 A1 * | 2/2012 | Bassani | 60/752 |

OTHER PUBLICATIONS

U.S. Appl. No. 13/115,051, filed May 24, 2011, Melton et al.
U.S. Appl. No. 13/115,058, filed May 24, 2011, Melton et al.
U.S. Appl. No. 13/115,063, filed May 24, 2011, Crawley et al.
Search Report and Written Opinion from EP Application No. 12168511.9 dated Mar. 18, 2013.

* cited by examiner

SYSTEM AND METHOD FOR TURBINE COMBUSTOR MOUNTING ASSEMBLY

BACKGROUND OF THE INVENTION

The subject matter disclosed herein relates to combustion systems, and, more particularly, to mounting assemblies within gas turbine engines.

Various combustion systems include combustion chambers in which fuel and air combust to generate hot gases. For example, a gas turbine engine may include one or more combustion chambers that are configured to receive compressed air from a compressor, inject fuel into the compressed air, and generate hot combustion gases to drive the turbine engine. Each combustion chamber may include one or more fuel nozzles, a combustion zone within a combustion liner, a flow sleeve surrounding the combustion liner, and a gas transition duct. Compressed air from the compressor flows to the combustion zone through a gap between the combustion liner and the flow sleeve. Mounting assemblies may be disposed in the gap to mount the combustion liner within the flow sleeve. Unfortunately, flow disturbances may be created as the compressed air passes by the mounting assemblies, thereby decreasing performance of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine combustor, which includes a combustion liner disposed about a combustion region, a flow sleeve disposed about the combustion liner, an air passage between the combustion liner and the flow sleeve, and an aerodynamic mounting assembly disposed in the air passage. The aerodynamic mounting assembly is configured to retain the combustion liner within the flow sleeve. The aerodynamic mounting assembly includes a flow sleeve mount coupled to the flow sleeve. The flow sleeve mount includes a first portion of an aerodynamic shape. The aerodynamic mounting assembly also includes a liner stop coupled to the combustion liner. The liner stop includes a second portion of the aerodynamic shape. The flow sleeve mount and the liner stop couple with one another to define the aerodynamic shape. Further, the aerodynamic shape is configured to direct an airflow into a wake region downstream of the aerodynamic mounting assembly.

In a second embodiment, a system includes a turbine combustor liner mount configured to couple a combustor liner with a combustor flow sleeve of a gas turbine combustor. The turbine combustor liner mount includes an aerodynamic flow surface having a leading edge and a trailing edge. The aerodynamic flow surface converges toward the trailing edge and the aerodynamic flow surface is configured to reduce a wake in a wake region downstream from the turbine combustor liner mount.

In a third embodiment, a method includes reducing a wake in a wake region downstream from a turbine combustor liner mount along an airflow path between a combustion liner and a flow sleeve of a gas turbine combustor. Reducing the wake includes dividing the airflow into a first flow and a second flow and aerodynamically combining the first and second flows into the wake region.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for reducing a wake in a wake region downstream from an aerodynamic mounting assembly obstructing a gas flow. For example, the aerodynamic mounting assembly may obstruct an airflow between a combustion liner and a flow sleeve of a gas turbine combustor of a gas turbine engine. The aerodynamic mounting assembly may direct a flow into the wake region downstream of the aerodynamic mounting assembly. The aerodynamic mounting assembly may include a flow sleeve mount coupled to the flow sleeve and a liner stop coupled to the combustion liner. The flow sleeve mount and the liner stop may represent first and section portions of an aerodynamic shape, respectively. Specifically, the flow sleeve mount and the liner stop couple with one another to define the aerodynamic shape, such as an airfoil shape. In addition, the aerodynamic mounting assembly may include a leading edge and a trailing edge, with curved surfaces extending from the leading edge to the trailing edge. In certain embodiments, the curved surfaces may have an aerodynamic shape. For example, the curved surfaces may first diverge and then converge toward one another (e.g., diverging-converging surfaces). In the disclosed embodiments, the wake downstream of the aerodynamic mounting assembly is essentially filled with a higher velocity fluid, namely the portion of the gas flow leaving the trailing edge. Filling of the wake with the gas flow from the trailing edge helps to reduce the size and formation of the wake. In other words, the aerodynamic mounting assembly is configured to reduce a low velocity region downstream of the aerodynamic mounting assembly by gradually splitting the flow upstream of the aerodynamic mounting assembly and gradually recombining the flow downstream of the aerodynamic mounting assembly.

Reducing the wake in the wake region downstream from the aerodynamic mounting assembly may offer several benefits. For example, without the disclosed embodiments, fuel injected downstream of the aerodynamic mounting assembly may be pulled into the wake. The fuel may accumulate in the wake and cause flame holding, thereby decreasing performance of the gas turbine engine. In addition, the presence of wakes may result in a higher pressure drop across the combustion liner. The presently disclosed embodiments employ the aerodynamic mounting assembly to reduce wakes and avoid the disadvantages of other methods of wake reduction. For example, using the aerodynamic mounting assembly may reduce the possibility of flame holding, increase the gas turbine engine performance, and decrease the pressure drop across the combustion liner. In addition, the aerodynamic mounting assembly may be less expensive, less complicated, easier to manufacture and install, and more reliable than other methods of wake reduction. Thus, use of the disclosed aerodynamic mounting assemblies is particularly well suited for reducing wakes in gas turbine engines and other combustion systems.

Figure 1:
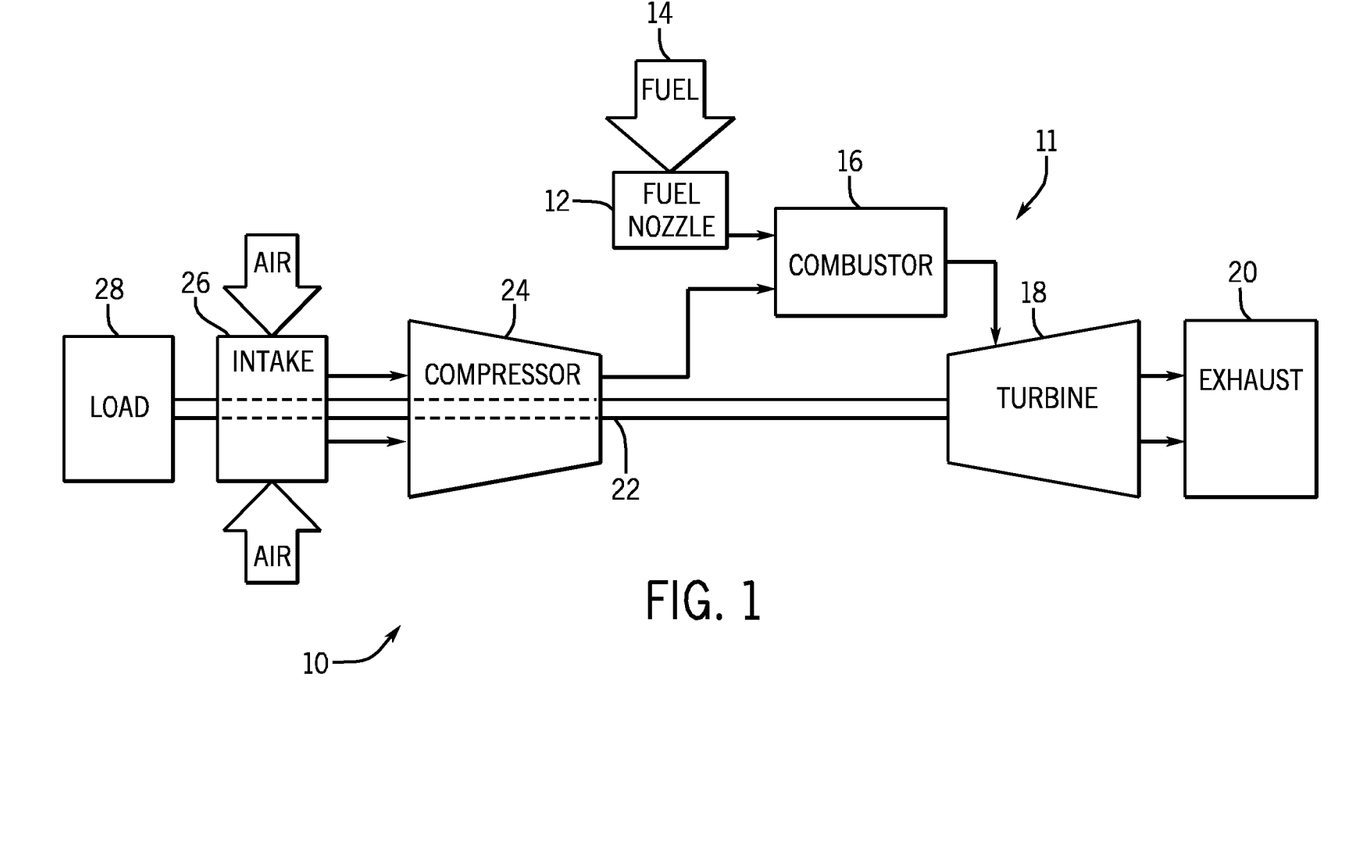
FIG. 1 is a block diagram of an embodiment of a turbine system having a combustor.

FIG. 1 is a block diagram of an embodiment of a turbine system 10 having a gas turbine engine 11. As described in detail below, the disclosed turbine system 10 employs one or more combustors 16 with an improved design to reduce wakes within an air supply passage of the combustor 16. The turbine system 10 may use liquid or gas fuel, such as natural gas and/or a synthetic gas, to drive the turbine system 10. As depicted, one or more fuel nozzles 12 intake a fuel supply 14, partially mix the fuel with air, and distribute the fuel and air mixture into the combustor 16 where further mixing occurs between the fuel and air. The air-fuel mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
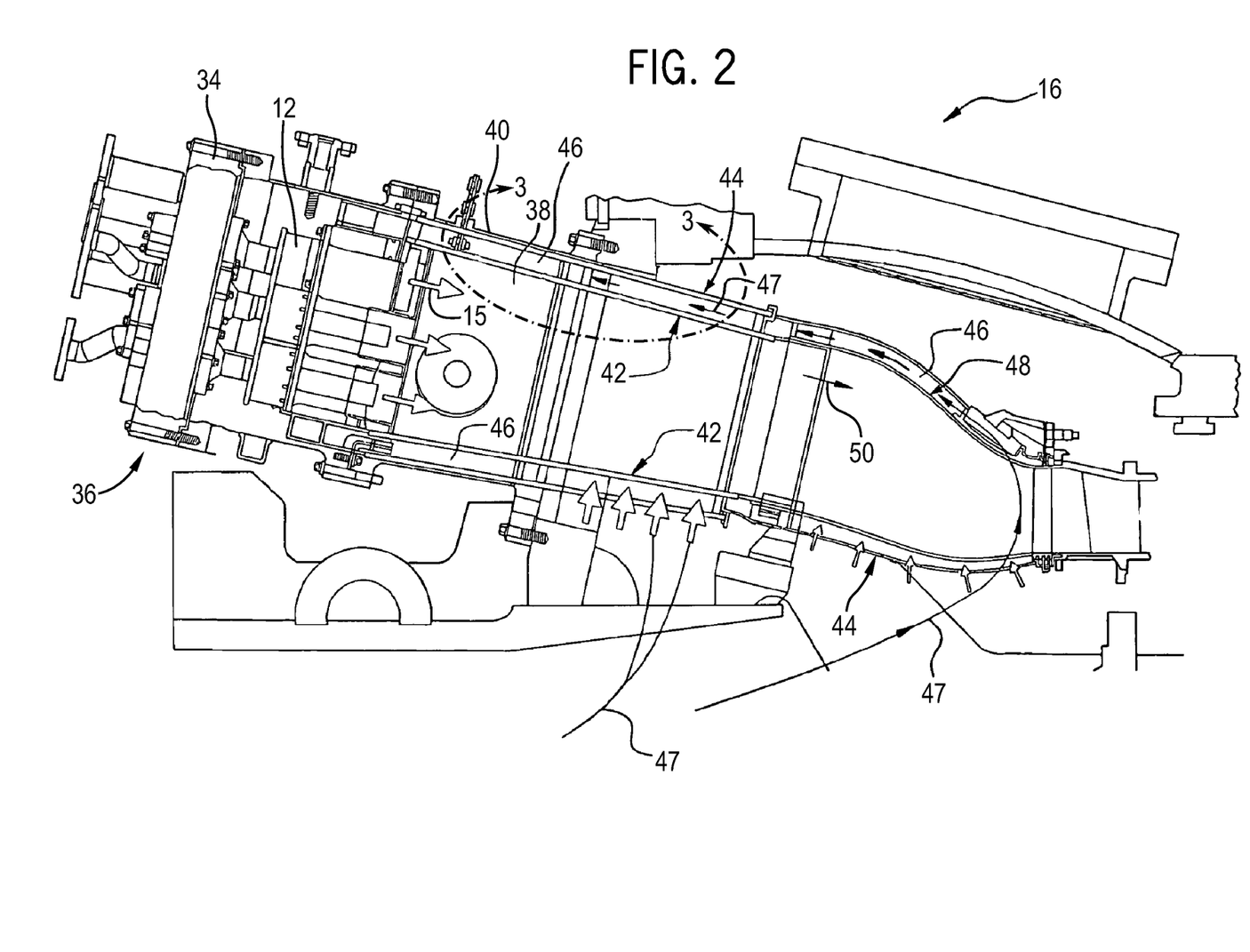
FIG. 2 is a cutaway side view of an embodiment of the turbine system as illustrated in FIG. 1, further illustrating details of the combustor.

FIG. 2 is a cutaway side view of an embodiment of the combustor 16 of the gas turbine engine 11, as illustrated in FIG. 1. As illustrated, one or more fuel nozzles 12 are located inside the combustor 16, wherein each fuel nozzle 12 is configured to partially premix air and fuel within intermediate or interior walls of the fuel nozzles 12 upstream of the injection of air, fuel, or an air-fuel mixture into the combustor 16. For example, each fuel nozzle 12 may divert fuel into air passages, thereby partially premixing a portion of the fuel with air to reduce high temperature zones and nitrogen oxide ($NO_x$) emissions. Further, the fuel nozzles 12 may inject a fuel-air mixture 15 into the combustor 16 in a suitable ratio for optimal combustion, emissions, fuel consumption, and power output.

As illustrated in FIG. 2, the plurality of fuel nozzles 12 is attached to an end cover 34, near a head end 36 of the combustor 16. Compressed air and fuel are directed through the end cover 34 and the head end 36 to each of the fuel nozzles 12, which distribute the fuel-air mixture 15 into a combustion chamber 38 of the combustor 16. The combustion chamber 38, or combustion region, is generally defined by a combustion casing 40, a combustion liner 42, and a flow sleeve 44. As shown in FIG. 2, the flow sleeve 44 is disposed about the combustion liner 42. In certain embodiments, the flow sleeve 44 and the combustion liner 42 are coaxial with one another to define a hollow annular space 46, or annular air passage, which may enable passage of air 47 for cooling and for entry into the head end 36 and the combustion chamber 38. As discussed below, one or more aerodynamic mounting assemblies may be disposed in the hollow annular space 46 to reduce the wake associated with the mounting assemblies. For example, the aerodynamic mounting assemblies may guide the airflow into the wake region, and thus fill the wake region with airflow to reduce the wake. In this manner, the aerodynamic mounting assembly helps improve the flow, air-fuel mixing, and combustion downstream of the aerodynamic mounting assembly. For example, downstream of the aerodynamic mounting assemblies, the fuel nozzles 12 inject fuel and air into the combustion chamber 38 to generate hot combustion gases, which then flow through the transition piece 48 to the turbine 18, as illustrated by arrow 50. The combustion gases then drive rotation of the turbine 18 as discussed above.

Figure 3:
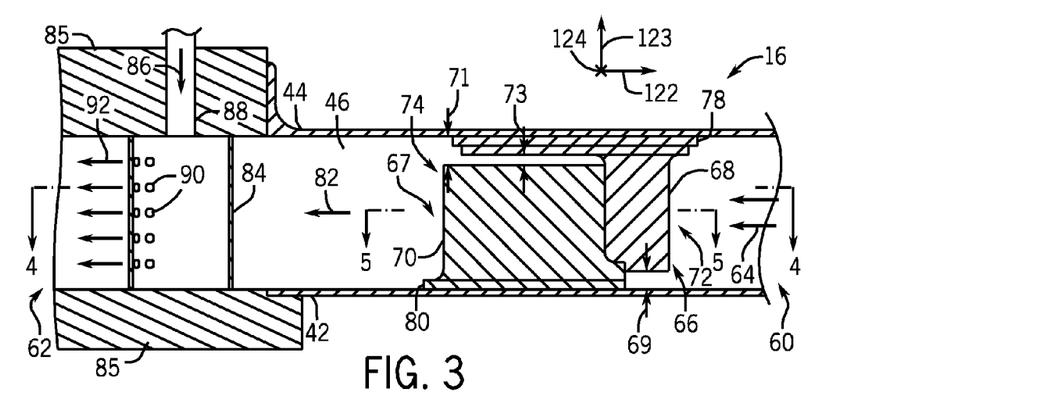
FIG. 3 is a partial cross-sectional side view of an embodiment of the combustor as illustrated in FIG. 2, taken within line 3-3, illustrating an aerodynamic mounting assembly.

FIG. 3 is a partial cross-sectional side view of an embodiment of the combustor 16 as illustrated in FIG. 2 taken within line 3-3. As illustrated, the combustor 16 includes an upstream side 60 that receives a compressed airflow 64, and a downstream side 62 that outputs the compressed airflow 64 to the head end 36. Specifically, an airflow 64 enters the upstream side 60 of the annular space 46. Moving downstream from the upstream side 60, an aerodynamic mounting assembly 66 extends between the combustion liner 42 and the flow sleeve 44. The aerodynamic mounting assembly 66 is configured to retain the combustion liner 42 within the flow sleeve 44. In addition, the aerodynamic mounting assembly 66 obstructs the airflow 64 flowing through the annular space 46, creating a wake in a wake region 67 located downstream from the aerodynamic mounting assembly 66. The wake region 67 is a region of recirculating flow immediately behind the aerodynamic mounting assembly 66, caused by the flow of surrounding fluid around the aerodynamic mounting assembly 66. As shown in FIG. 3, the aerodynamic mounting assembly 66 includes at least two portions. The first portion of the aerodynamic mounting assembly 66 may be a flow sleeve mount 68 coupled to the flow sleeve 44. A flow sleeve mount gap 69 may exist between the flow sleeve mount 68 and the combustion liner 42 to allow for thermal expansion and/or movement of the combustion liner 42 and/or the flow sleeve 44 during operation of the gas turbine engine 11. Similarly, the second portion of the aerodynamic mounting assembly 66 may be a liner stop 70 coupled to the combustion liner 42. A liner stop gap 71 may exist between the liner stop 70 and the flow sleeve 44 to allow for thermal expansion and/or movement of the combustion liner 42 and/or the flow sleeve 44. In addition, a gap 73 may exist between the flow sleeve mount 68 and the liner stop 70 for reasons similar to those described above. In other embodiments, the positions of the flow sleeve mount 68 and the liner stop 70 may be swapped. In other words, the liner stop 70 may be upstream of the flow sleeve mount 68.

In the illustrated embodiment, the aerodynamic mounting assembly 66 may include a leading edge 72 facing the upstream side 60 and a trailing edge 74 facing the downstream side 62. The leading edge 72 may also be referred to as the front end and the trailing edge 74 may be referred to as the back end. In the illustrated embodiment, the leading edge 72 is located on the flow sleeve mount 68 and the trailing edge 74 is located on the liner stop 70. In other embodiments, the locations of the flow sleeve mount 68 and the liner stop 70 may be swapped. In other words, the leading edge may be located on the liner stop 70 and the trailing edge 74 may be located on the flow sleeve mount 68. In certain embodiments, a flow sleeve mount bracket 78 may be used to couple the flow sleeve mount 68 to the flow sleeve 44. Similarly, a liner stop bracket 80 may be used to couple the liner stop 70 to the combustion liner 42. The flow sleeve mount bracket 78 and the liner stop bracket 80 may be coupled to the flow sleeve 44 and the combustion liner 42, respectively, using various techniques, such as, but not limited to, welding, brazing, adhesives, bolting, screws, mechanical joints, or other suitable fasteners.

As described in more detail below, the airflow 64 encounters the aerodynamic mounting assembly 66 at the leading edge 72 and leaves the aerodynamic mounting assembly 66 from the trailing edge 74. When the airflow 64 flowing toward the aerodynamic mounting assembly 66 encounters the leading edge 72, the airflow 64 divides into two flows, as described in more detail below. The airflow 64 further away from the aerodynamic mounting assembly 66 may bypass the aerodynamic mounting assembly 66. The two divided flows of the airflow 64 flow along the surfaces of the aerodynamic mounting assembly 66 and aerodynamically recombine near the trailing edge 74 to form a downstream airflow 82 in the wake region 67 extending from the aerodynamic mounting assembly 66. Specifically, the aerodynamic mounting assembly 66 may reduce a wake in the downstream airflow 82. In certain embodiments, the downstream airflow 82 may encounter one or more fuel injectors 84 disposed downstream of the aerodynamic mounting assembly 66, the combustion liner 42, and the flow sleeve 44. Specifically, the fuel injectors 84 may be located in an annulus formed by a cap 85. In certain embodiments, the fuel injector 84 may be a quaternary injector that injects a portion of a fuel 86 into the downstream airflow 82 upstream from the fuel nozzles 12. The fuel 86 may be carried to the fuel injector 84 through a fuel manifold 88. In certain embodiments, one or more fuel openings 90 may be disposed in the fuel injector 84 facing toward the downstream side 62 of the combustor 16. The fuel 86 may mix with the downstream airflow 82 to form an air-fuel mixture 92 that then flows to the fuel nozzles 12.

Figure 4:
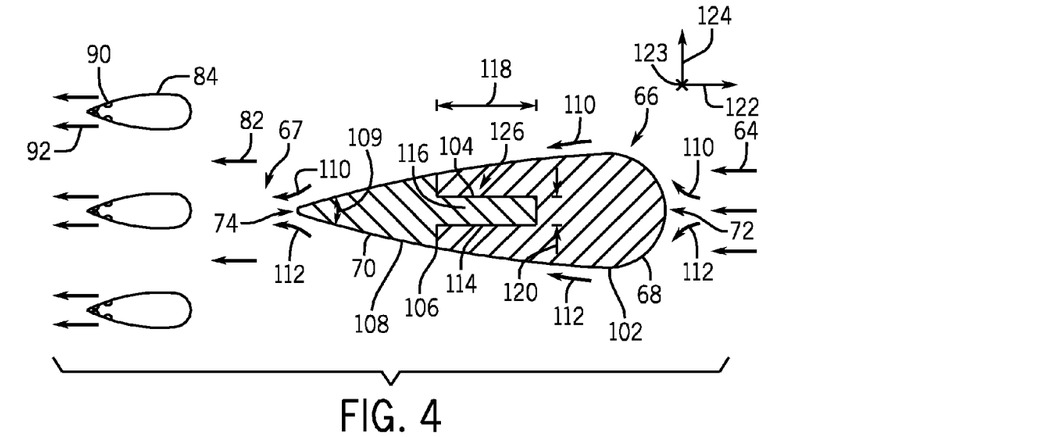
FIG. 4 is a cross-sectional top view of an embodiment of an aerodynamic mounting assembly and a plurality of fuel injectors taken along line 4-4 of FIG. 3.

FIG. 4 is a top cross-sectional view of an embodiment of the aerodynamic mounting assembly 66 and the fuel injectors 84 along the line labeled 4-4 in FIG. 3. As shown in FIG. 4, the flow sleeve mount 68 and the liner stop 70 couple with one another to form the aerodynamic mounting assembly 66. In the illustrated embodiment, the flow sleeve mount 68 includes a U-shaped portion 102, which may also be described as a horseshoe shape. The liner stop 70 of the illustrated embodiment has a straight portion 104, a transition portion 106, and a tapered portion 108. When the positions of the flow sleeve mount 68 and the liner stop 70 are swapped, the flow sleeve mount 68 may include the straight portion 104, the transition portion 106, and the tapered portion 108, and the liner stop 70 may include the U-shaped portion 102. Alternatively, the tapered portion 108 may be located near the leading edge 72 and the U-shaped portion 102 may be located near the trailing edge 74. In the illustrated embodiment, the transition and tapered portions 106 and 108 of the liner stop 70 are wider than the straight portion 104. Thus, the liner stop 70 has an arrowhead shape. In certain embodiments, a tapered portion angle 109 may be adjusted to provide either a wider or thinner appearance to the tapered portion 108. For example, the tapered portion angle 109 may be between approximately 10 to 80 degrees, 25 to 65 degrees, or 35 to 45 degrees. A leading edge angle may be adjusted in a similar manner. In addition, in the illustrated embodiment, the aerodynamic mounting assembly 66 has an aerodynamic cross-sectional shape, such as an airfoil shape. In other embodiments, as discussed in detail below, the aerodynamic mounting assembly 66 may have other aerodynamic cross-sectional shapes, such as oval, tapered, or generally diverging-converging surfaces. In addition, both the flow sleeve mount 68 and the liner stop 70 contribute to the aerodynamic cross-sectional shape of the aerodynamic mounting assembly 66. In other embodiments, only the portion of the aerodynamic mounting assembly 66 located near the leading edge 72 (e.g., the U-shaped portion 102) may contribute to the aerodynamic cross-sectional shape. In further embodiments, only the portion of the aerodynamic mounting assembly 66 located near the trailing edge 74 (e.g., the tapered portion 108) may contribute to the aerodynamic cross-sectional shape. In various embodiments, the shape of the aerodynamic mounting assembly 66 and other characteristics of the aerodynamic mounting assembly 66 (e.g., width, length, length-to-width ratio, height, surface texture, and so forth) may be adjusted to achieve the desired reduction of the wake in the downstream airflow 82.

As shown in FIG. 4, upon reaching the leading edge 72 of the aerodynamic mounting assembly 66, the airflow 64 divides into a first flow 110 and a second flow 112. The first and second flows 110 and 112 flow along opposite curved surfaces of an aerodynamic flow surface of the aerodynamic mounting assembly 66 and aerodynamically combine near the trailing edge 74 to form the downstream airflow 82. Thus, the aerodynamically combined first and second flows 110 and 112 fill the wake region 67 downstream of the aerodynamic mounting assembly 66, thereby reducing flow separation and reducing lateral spreading of the wake. In this manner, the aerodynamic mounting assembly 66 substantially reduces or eliminates a low velocity recirculation zone downstream of the aerodynamic mounting assembly 66. In other words, without the aerodynamic mounting assembly 66, the wake region 67 may include a low velocity region due to a significant gap between the first and second flows 110 and 112 at the trailing edge 74. In the illustrated embodiment, the first and second flows 110 and 112 gradually converge with one another to eliminate such a gap, thereby reducing the possibility of any low velocity region downstream of the trailing edge 74. In other words, the first and second flows 110 and 112 are guided toward one another by the aerodynamic mounting assembly 66 to combine directly downstream of the trailing edge 74 to fill the wake region 67. In the illustrated embodiment, the aerodynamic flow surface of the aerodynamic mounting assembly 66 first diverges and then converges toward the trailing edge 74.

The flow sleeve mount 68 of the aerodynamic mounting assembly 66 shown in FIG. 4 includes a first connector 114 and the liner stop 70 includes a second connector 116. The first and second connectors 114 and 116 mate with one another in an axial direction 122 along the combustor 16. The radial direction of the combustor 16 is indicated by arrow 123 and the circumferential direction is indicated by arrow 124. Thus, the first and second connectors 114 and 116 slide together in the axial direction 122, while blocking movement in the circumferential direction 124. As discussed in detail below, the first and second connectors 114 and 116 may mate in other directions, such as the radial or circumferential directions 123 and 124. Together, the first and second connectors 114 and 116 may be referred to as an axial stop 126. The axial stop 126 may help maintain the flow sleeve mount 68 and the liner stop 70 coupled to one another during operation of the combustor 16. Specifically, the configuration of the axial stop 126 may use the force of the airflow 64 against the leading edge 72 of the flow sleeve mount 68 to help maintain the flow sleeve mount 68 against the liner stop 70. In addition, the configuration of the axial stop 126 may help keep the flow sleeve mount 68 coupled to the liner stop 70 when the airflow 64 is not aligned with the axial direction 122. For example, as shown in FIG. 4, the first connector 114 may include a female alignment portion (e.g., a notch) and the second connector 116 may include a male alignment portion (e.g., a tab). In other embodiments, the first connector 114 may be the male alignment portion and the second connector 116 may be the female alignment portion. Such a configuration may help the flow sleeve mount 68 from moving or twisting away from the axial direction 122. In other words, the first and second connectors 114 and 116 may block movement of the flow sleeve mount 68 in a circumferential direction 124. In other embodiments, other suitable fastening techniques may be used for the axial stop 126, such as, but not limited to, adhesives, welds, brazes, bolts, screws, mechanical joints, and other fasteners. In addition, the axial stop 126 is defined by a length 118 and a width 120, either or both of which may be selected to provide suitable characteristics for the axial stop 126.

As shown in FIG. 4, the annular space 46 may include more than one fuel injector 84. Each of the fuel injectors 84 may have an aerodynamic cross-sectional shape. Such a configuration of the fuel injectors 84 may reduce a wake in the air-fuel mixture 92 downstream of the fuel injectors 84. Reduction of the wake in the wake region 67 behind the aerodynamic mounting assembly 66 may offer several benefits. For example, less of the fuel 86 may be pulled into the wake region 67 behind the aerodynamic mounting assembly 66. This may reduce the possibility of flame holding of the gas turbine engine 11 and/or enable a higher percentage of fuel injection for increased performance of the gas turbine engine 11. In addition, the overall pressure drop through the annular space 46 may be reduced through reduction of the wake by the aerodynamic mounting assembly 66. Thus, use of the aerodynamic mounting assembly 66 may improve uniformity of airflow and air-fuel mixing upstream of the head end 36, thereby improving airflow and air-fuel mixing in the fuel nozzles 12.

Figure 5:
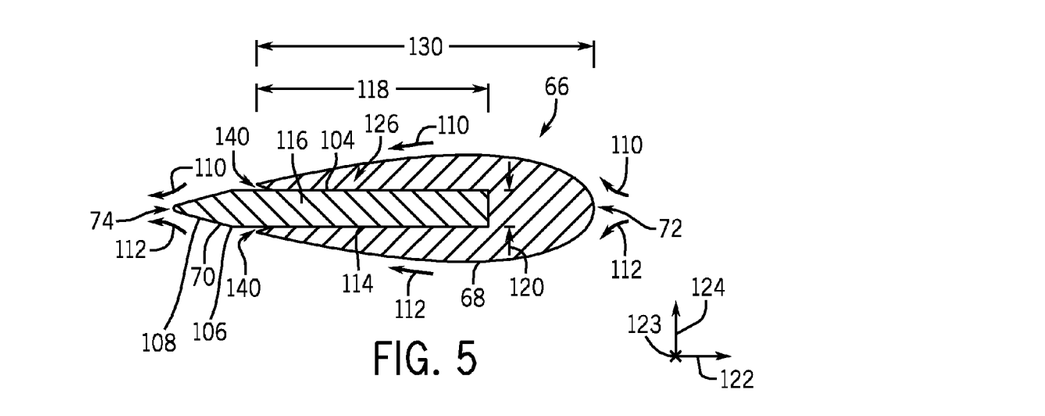
FIG. 5 is a cross-sectional top view of an embodiment of an aerodynamic mounting assembly taken along line 5-5 of FIG. 3.

FIG. 5 is a top cross-sectional view of another embodiment of the aerodynamic mounting assembly 66 taken along line 5-5 of FIG. 3. As shown in FIG. 5, the flow sleeve mount 68 includes a U-shaped portion 102. In addition, in the illustrated embodiment, the aerodynamic mounting assembly 66 includes a longer first connector 114, compared to that shown in FIG. 4, as indicated by length 118. Indeed, the second connector 116 may extend through more than half of an axial length 130 of the flow sleeve mount 68. For example, in certain embodiments, the second connector 116 may extend more than at least approximately 60 percent, 70 percent, 80 percent, or 90 percent of the axial length 130. Such a configuration of the axial stop 126 may provide additional strength to the coupling between the flow sleeve mount 68 and the liner stop 70. In addition, the shape of the liner stop 70 shown in FIG. 5 is different from the shape of the liner stop 70 shown in FIG. 4. For example, the liner stop 70 of FIG. 5 has the straight portion 104 as the second connector 116, and the tapered portion 108 that converges directly away from the straight portion 104. In other words, the tapered portion 108 is angled toward the trailing edge 74 from the transition portion 106 between the straight portion 104 and the tapered portion 108, wherein the transition portion 106 has a width equal to the straight portion 104. The simpler shape of the liner stop 70 shown in FIG. 5 may be easier to manufacture than the liner stop 70 shown in FIG. 4. In addition, the flow sleeve mount 68 includes an alignment feature 140, which may be curved, straight, or beveled, to facilitate assembly of the aerodynamic mounting assembly 66. As illustrated, the alignment feature 140 includes outwardly angled edges, which help guide the second connector 116 into the first connector 114. Accordingly, when using the alignment feature 140, the liner stop 70 and the flow sleeve mount 68 need not be completely axially aligned with one another when first brought together for assembly. As with the embodiment shown in FIG. 4, the positions of the flow sleeve mount 68 and the liner stop 70, and/or the U-shaped portion 102 and the tapered portion 108 may be swapped.

Figure 6:
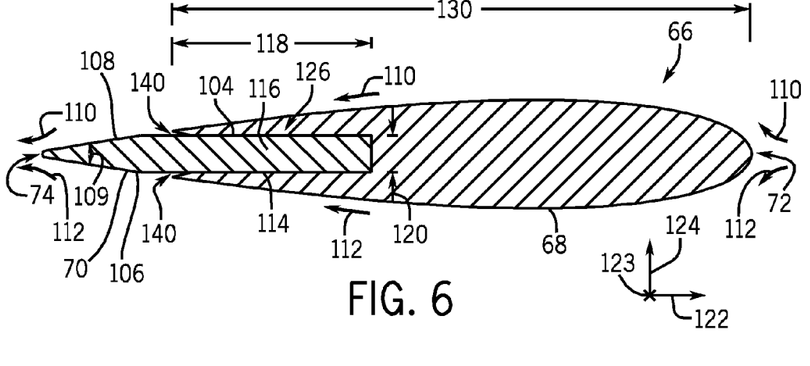
FIG. 6 is a cross-sectional top view of an embodiment of an aerodynamic mounting assembly taken along line 5-5 of FIG. 3.

FIG. 6 is a top cross-sectional view of an embodiment of the aerodynamic mounting assembly 66 taken along line 5-5 of FIG. 3. As shown in FIG. 6, the aerodynamic mounting assembly 66 includes a shorter first connector 114, compared to that shown in FIG. 5, as indicated by length 118. Indeed, the second connector 116 extends through less than half of the axial length 130 of the flow sleeve mount 68. For example, in certain embodiments, the second connector 116 may extend less than at least approximately 10 percent, 20 percent, 30 percent, or 40 percent of the axial length 130. Such a configuration of the axial stop 126 may reduce the length 118 of the first connector 114 cut into or formed in the flow sleeve mount 68, which may simplify manufacture of the flow sleeve mount 68. In addition, the tapered portion angle 109 of the illustrated embodiment is less than in previous embodiments, thereby giving the trailing edge 74 of the aerodynamic mounting assembly 66 a more tapered, or thinner, appearance. In other respects, the embodiment of the aerodynamic mounting assembly 66 shown in FIG. 6 is similar to that of the previously discussed embodiments.

Figure 7:
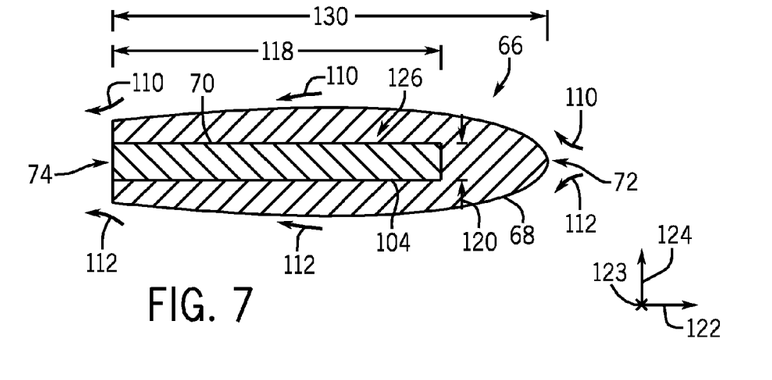
FIG. 7 is a cross-sectional top view of an embodiment of an aerodynamic mounting assembly taken along line 5-5 of FIG. 3.

FIG. 7 is a top cross-sectional view of an embodiment of the aerodynamic mounting assembly 66 taken along line 5-5 of FIG. 3. As shown in FIG. 7, the second connector 116 extends through more than half of the axial length 130 of the flow sleeve mount 68. For example, in certain embodiments, the second connector 116 may extend more than at least approximately 60 percent, 70 percent, 80 percent, or 90 percent of the axial length 130. In addition, in the illustrated embodiment, the liner stop 70 does not substantially contribute to the aerodynamic shape of the aerodynamic mounting assembly 66. In other words, the liner stop 70 does not include the transition and tapered portions 106 and 108, but only includes the straight portion 104. Thus, both the flow sleeve mount 68 and the liner stop 70 form an essentially flat trailing edge 74. Such a configuration of the aerodynamic mounting assembly 66 may simplify manufacture of the liner stop 70. Indeed, the illustrated embodiment of the aerodynamic mounting assembly 66 may be used in situations where an aerodynamic flow sleeve mount 68 is coupled to an existing liner stop 70, which may or may not be aerodynamically shaped. In addition, the illustrated embodiment may be used where an aerodynamic shape for the trailing edge 74 is not used. In other respects, the embodiment of the aerodynamic mounting assembly 66 shown in FIG. 7 is similar to that of the previously discussed embodiments.

Figure 8:
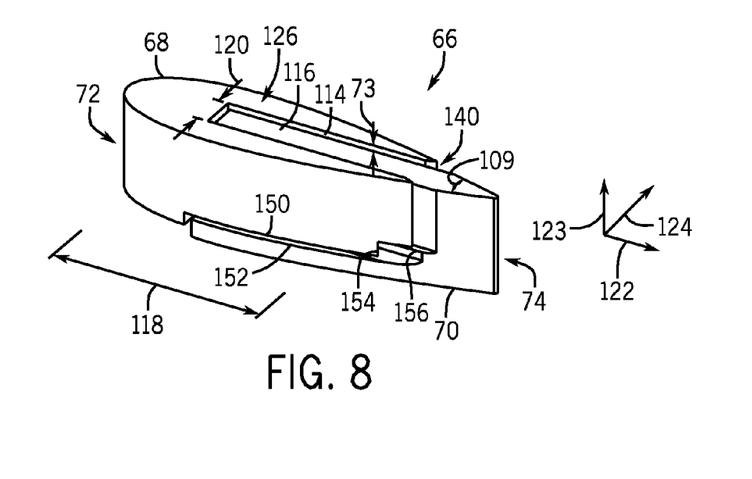
FIG. 8 is a perspective view of an embodiment of an aerodynamic mounting assembly.

FIG. 8 is a perspective view of the embodiment of the aerodynamic mounting assembly 66 shown in FIG. 5. As shown in FIG. 8, the flow sleeve mount 68 includes a horizontal notch 150 and the liner stop 70 includes a horizontal extension 152, which couple together to provide additional stability to the axial stop 126. As illustrated, the horizontal notch 150 and the horizontal extension 152 extend in the radial direction 123 to provide a radial stop. In addition, the horizontal extension 152 provides a larger surface to couple the liner stop 70 to the liner stop bracket 80 or directly to the combustion liner 42. In addition, the flow sleeve mount 68 includes a positioning notch 154 and the liner stop 70 includes a positioning ledge 156, which couple together to provide stability to the axial stop 126 and facilitate assembly of the aerodynamic mounting assembly 66. As illustrated, the positioning notch 154 and the positioning ledge 156 extend in the axial direction 122 along the aerodynamic mounting assembly 66 to provide an axial guide.

Figure 9:
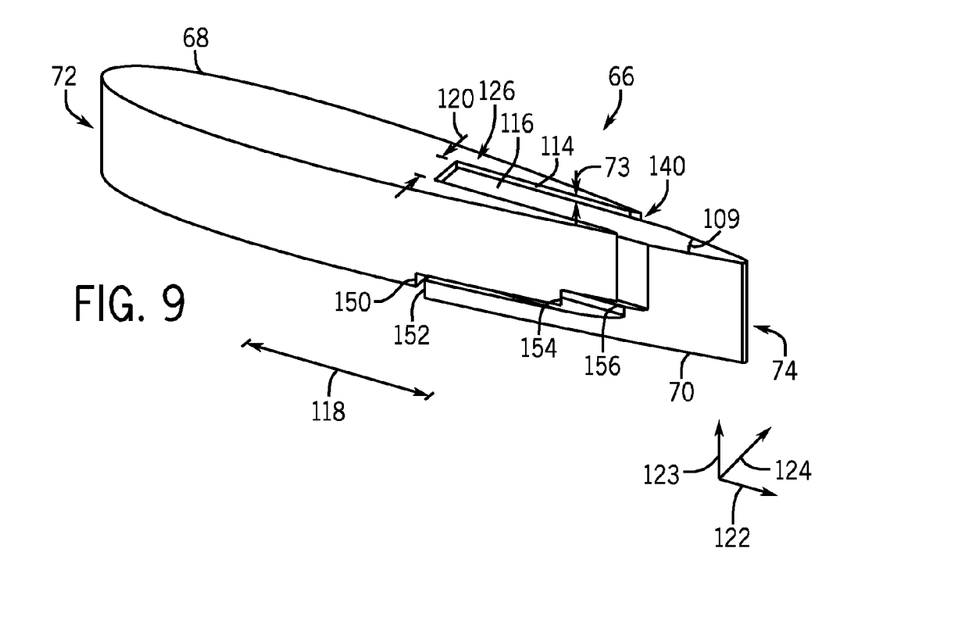
FIG. 9 is a perspective view of an embodiment of an aerodynamic mounting assembly.
Figure 10:
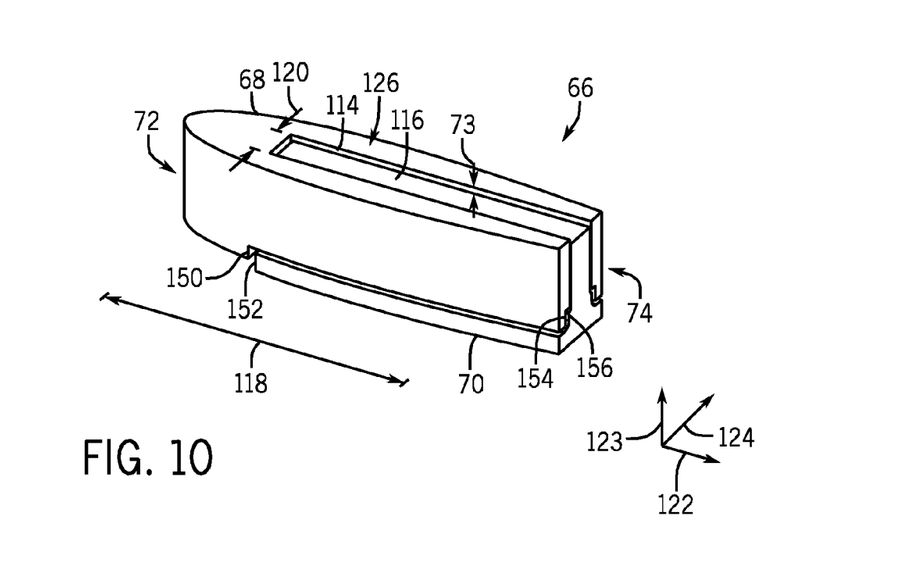
FIG. 10 is a perspective view of an embodiment of an aerodynamic mounting assembly.

FIGS. 9 and 10 are perspective views of the embodiments of the aerodynamic mounting assemblies 66 shown in FIGS. 6 and 7, respectively. As shown in FIGS. 9 and 10, the aerodynamic mounting assemblies 66 include the horizontal notch 150, the horizontal extension 152, the positioning notch 154, and the positioning ledge 156, described in detail above. In the embodiment illustrated in FIG. 9, the tapered portion angle 109 is less than that of the embodiment shown in FIG. 8. In the embodiment illustrated in FIG. 10, the trailing edge 74 does not include a tapered portion angle 109, because the trailing edge 74 is essentially flat. In addition, the second connector 116 extends further into the flow sleeve mount 68 of the embodiment shown in FIG. 10 than in the embodiment shown in FIG. 9. In other respects, the embodiments of the aerodynamic mounting assemblies 66 shown in FIGS. 9 and 10 are similar to those of the previously discussed embodiments.

Figures 11, 12:
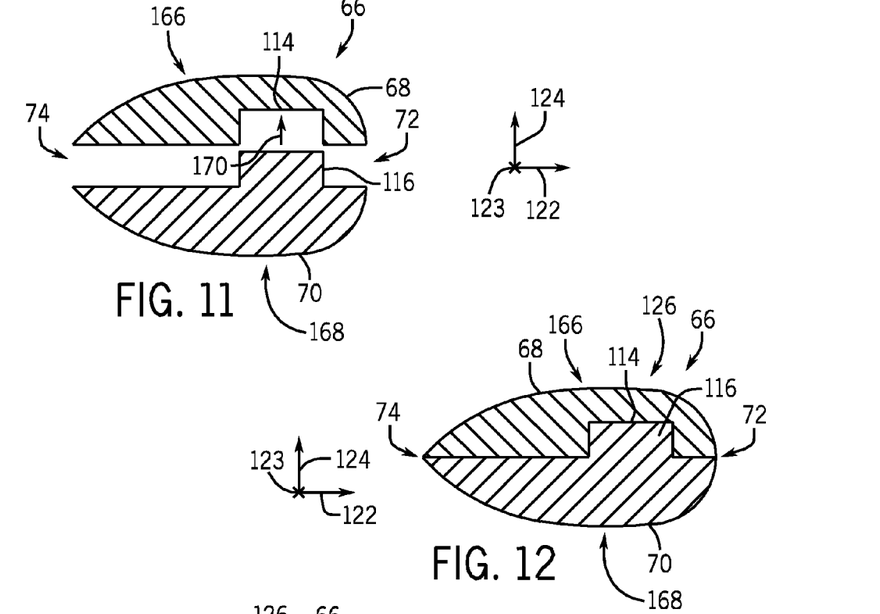
FIG. 11 is a cross-sectional top view of an embodiment of an aerodynamic mounting assembly before assembly.
FIG. 12 is a cross-sectional top view of the embodiment of the aerodynamic mounting assembly of FIG. 11 after assembly.

FIG. 11 is a top cross-sectional view of an embodiment of the aerodynamic mounting assembly 66 prior to assembly. As shown in FIG. 11, the aerodynamic mounting assembly 66 includes the first and second connectors 114 and 116, which are configured to mate with one another. For example, as shown in FIG. 11, the first connector 114 may include a female alignment portion (e.g., a notch) and the second connector 116 may include a male alignment portion (e.g., a tab). In other embodiments, the first connector 114 may be the male alignment portion and the second connector 116 may be the female alignment portion. In the illustrated embodiment, the first and second connectors 114 and 116 are aligned in the circumferential direction 124. Furthermore, the flow sleeve mount 68 includes a first curved surface 166 extending from the leading edge 72 to the trailing edge 74, and the liner stop 70 includes a second curved surface 168 extending from the leading edge 72 to the trailing edge 74. The interior surfaces of the flow sleeve mount 68 and the liner stop 70 are shown in FIG. 11 as flat surfaces, but may be curved in other embodiments. Such a configuration of the aerodynamic mounting assembly 66 may enable the combustion liner 42 and the flow sleeve 44 to be rotated about one another to engage the aerodynamic mounting assembly 66. In other words, the liner stop 70 may be moved in the direction of arrow 170 circumferentially toward the flow sleeve mount 68 during assembly. As the first and second connectors 114 and 116 of the illustrated embodiment may help prevent movement of either the combustion liner 42 or the flow sleeve 44 during operation of the combustor 16, the assembly 66 may be referred to as a circumferential stop. In addition, the first and second connectors 114 and 116 constitute an example of the axial stop 126, as the connectors 114 and 116 block movement in the axial direction 122. FIG. 12 is a top cross-sectional view of the embodiment of the aerodynamic mounting assembly 66 shown in FIG. 11 after assembly. As shown in FIG. 12, the flow sleeve mount 68 and the liner stop 70 couple together to form the aerodynamic shape, e.g., an airfoil shape, of the aerodynamic mounting assembly 66.

Figures 13, 14:
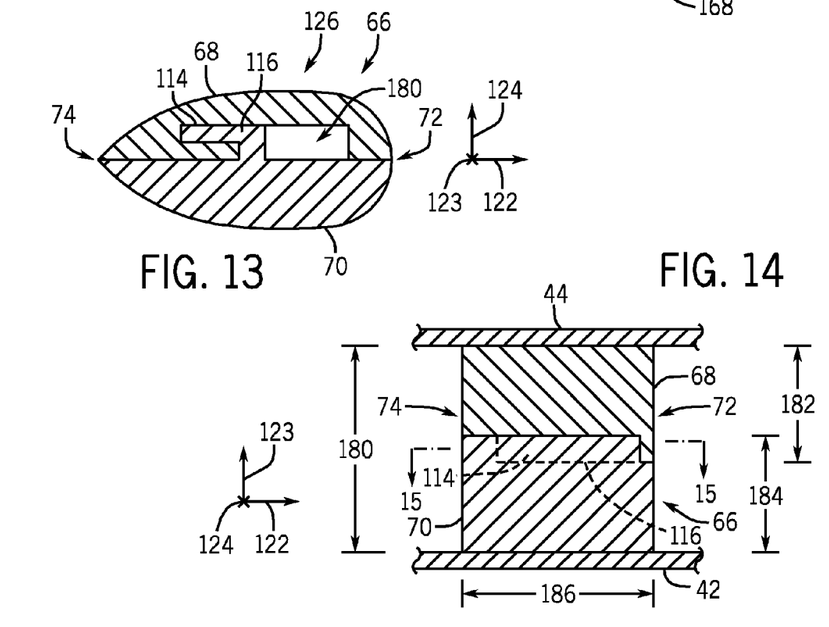
FIG. 13 is a cross-sectional top view of an embodiment of an aerodynamic mounting assembly taken along line 5-5 of FIG. 3.
FIG. 14 is a partial cross-sectional side view of an embodiment of an aerodynamic mounting assembly.

FIG. 13 is a top cross-sectional view of another embodiment of the aerodynamic mounting assembly 66 taken along line 5-5 of FIG. 3. As shown in FIG. 13, the flow sleeve mount 68 includes a mounting space 180 to accommodate the second connector 116 of the liner stop 70. Specifically, during assembly, the liner stop 70 may be first moved in the circumferential direction 124 toward the mounting space 180. Then, the liner stop 70 may be moved in the axial direction 122 to engage the second connector 116 with the first connector 114 of the flow sleeve mount 68. The first connector 114 may be an L-shaped slot and the second connector 116 may be an L-shaped hook. Such a configuration of the aerodynamic mounting assembly 66 may further resist decoupling, because motion in both the circumferential and axial directions 124 and 122 is used to decouple the aerodynamic mounting assembly 66. In other words, the first and second connectors 114 and 116 may define both the axial stop 126 and a circumferential stop. In other embodiments, various other locking mechanisms may be used to maintain the flow sleeve mount 68 and liner stop 70 coupled during operation.

Figure 15:
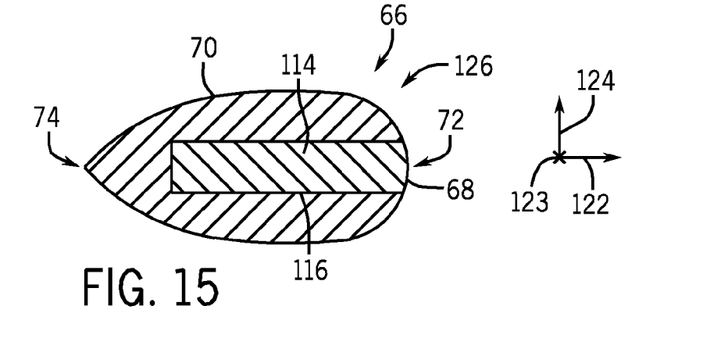
FIG. 15 is a cross-sectional top view of an embodiment of an aerodynamic mounting assembly taken along line 15-15 of FIG. 14.

FIG. 14 is a partial cross-sectional side view of an embodiment of the aerodynamic mounting assembly 66. As illustrated, flow sleeve mount 68 and the liner stop 70 each extend approximately half the radial distance 180 between the combustion liner 42 and the flow sleeve 44. For example, the flow sleeve mount 68 may have a radial height 182 that is approximately half of the radial distance 180 and the liner stop 70 may have a radial height 184 that is also approximately half of distance 180. Thus, the flow sleeve mount 68 and the liner stop 70 only partially overlap in the radial direction 123. Such a configuration of the aerodynamic mounting assembly 66 may be simpler to manufacture. Furthermore, the flow sleeve mount 68 and the liner stop 70 each extend the full axial distance 186 of the aerodynamic mounting assembly 66. Both the flow sleeve mount 68 and the liner stop 70 may have aerodynamic cross-sectional shapes, such as an airfoil shape. In addition, both the flow sleeve mount 68 and the liner stop 70 include the leading and trailing edges 72 and 74. FIG. 15 is a top cross-sectional view of an embodiment of the aerodynamic mounting assembly 66 along the line labeled 15-15 in FIG. 14, which represents the overlap portion of the aerodynamic mounting assembly 66. As shown in FIG. 15, the first connector 114 includes the male alignment portion and the second connector 116 includes the female alignment portion. In addition, the first and second connectors 114 and 116 define the axial stop 126. In other embodiments, the positions of the flow sleeve mount 68 and the liner stop 70 may be swapped.

Figure 16:
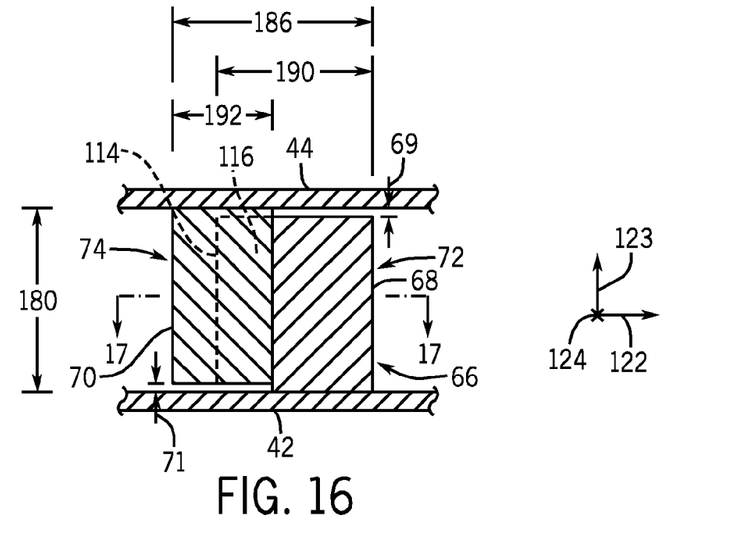
FIG. 16 is a partial cross-sectional side view of an embodiment of an aerodynamic mounting assembly.
Figure 17:
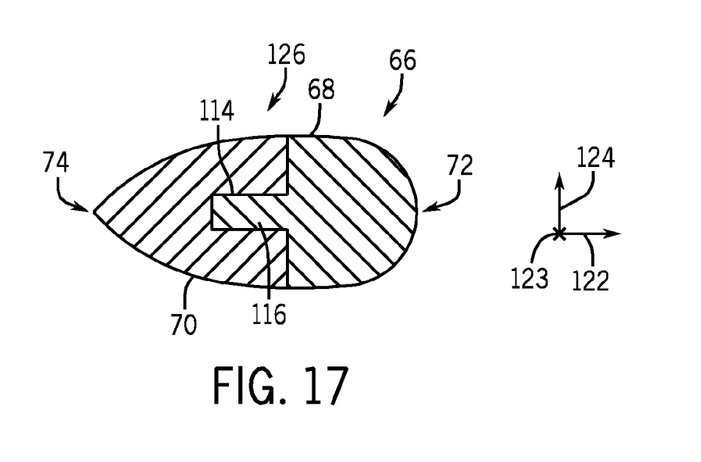
FIG. 17 is a cross-sectional top view of an embodiment of an aerodynamic mounting assembly taken along line 17-17 of FIG. 3.

FIG. 16 is a partial cross-sectional side view of a further embodiment of the aerodynamic mounting assembly 66. As illustrated, flow sleeve mount 68 and the liner stop 70 may each extend almost the radial distance 180 between the combustion liner 42 and the flow sleeve 44. In addition, the flow sleeve mount 68 and the liner stop 70 substantially overlap one another in the radial direction 123. As illustrated, flow sleeve mount 68 and the liner stop 70 each extend approximately half the axial distance 186 of the aerodynamic mounting assembly 66. For example, the flow sleeve mount 68 may have an axial length 190 that is approximately half of the axial distance 186 and the liner stop 70 may have an axial length 192 that is also approximately half of distance 186. Thus, the flow sleeve mount 68 and the liner stop 70 only partially overlap in the axial direction 122. FIG. 17 is a top cross-sectional view of an embodiment of the aerodynamic mounting assembly 66 along the line labeled 17-17 in FIG. 16. As shown in FIG. 17, the flow sleeve mount 68 defines the leading edge 72 and the liner mount 70 defines the trailing edge 74. As shown in FIG. 17, the first connector 114 includes the female alignment portion and the second connector 116 includes the male alignment portion. In addition, the first and second connectors 114 and 116 define the axial stop 126. Further, the second connector 116 extends into the liner stop 70. The shape of the leading edge 72 is generally curved and the shape of the trailing edge 74 is generally tapered. In other respects, the embodiment of the aerodynamic mounting assembly 66 shown in FIG. 16 is similar to those of the previously discussed embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine combustor, comprising:
a combustion liner disposed about a combustion region;
a flow sleeve disposed about the combustion liner;
an air passage between the combustion liner and the flow sleeve; and
an aerodynamic mounting assembly disposed in the air passage, wherein the aerodynamic mounting assembly is configured to retain the combustion liner within the flow sleeve, and the aerodynamic mounting assembly comprises:
a flow sleeve mount coupled to the flow sleeve, wherein the flow sleeve mount comprises a first portion of an aerodynamic shape; and
a liner stop coupled to the combustion liner, wherein the liner stop comprises a second portion of the aerodynamic shape, the flow sleeve mount and the liner stop couple with one another to define the aerodynamic shape, the aerodynamic shape is configured to direct an airflow into a wake region downstream of the aerodynamic mounting assembly, the aerodynamic shape comprises a leading edge and a trailing edge, the leading edge faces toward a direction of the airflow, the trailing edge faces away from the direction of the airflow, and a trailing edge angle of the aerodynamic shape is less than a leading edge angle of the aerodynamic shape.

2. The system of claim 1, wherein the first portion is upstream from the second portion.

3. The system of claim 1, wherein the first portion is downstream from the second portion.

4. The system of claim 1, wherein the first portion comprises a first curved surface extending from the leading edge to the trailing edge of the aerodynamic shape, and the second portion comprises a second curved surface extending from the leading edge to the trailing edge of the aerodynamic shape.

5. The system of claim 1, wherein the aerodynamic shape comprises an airfoil shaped cross-section.

6. The system of claim 1, comprising a fuel injector disposed downstream of the combustion liner and the flow sleeve, wherein the fuel injector obstructs the airflow through the air passage downstream from the aerodynamic mounting assembly, and the aerodynamic mounting assembly is configured to reduce a wake in the airflow from the aerodynamic mounting assembly.

7. The system of claim 1, wherein the flow sleeve mount comprises a first connector, the liner stop comprises a second connector, and the first and second connectors mate with one another in an axial direction along the air passage.

8. The system of claim 1, wherein the flow sleeve mount comprises a first connector, the liner stop comprises a second connector, and the first and second connectors mate with one another in a circumferential direction along the air passage.

9. The system of claim 1, comprising a gas turbine engine having the gas turbine combustor.

10. A system, comprising:
a turbine combustor liner mount configured to couple a combustor liner with a combustor flow sleeve within a path of a fluid flow in a gas turbine combustor, wherein the turbine combustor liner mount comprises an aerodynamic flow surface having a leading edge and a trailing edge, the aerodynamic flow surface converges toward the trailing edge, the aerodynamic flow surface is configured to reduce a wake in a wake region along the path of the fluid flow downstream from the turbine combustor liner mount, and a trailing edge angle of the aerodynamic flow surface is less than a leading edge angle of the aerodynamic flow surface.

11. The system of claim 10, wherein the turbine combustor liner mount comprises a first mount portion configured to mate with a second mount portion to define the aerodynamic flow surface, the first mount portion is configured to couple with the combustor liner, and the second mount portion is configured to couple with the combustor flow sleeve.

12. The system of claim 11, wherein the first mount portion comprises the leading edge of the aerodynamic flow surface while the second mount portion comprises the trailing edge of the aerodynamic flow surface, or the first mount portion comprises the trailing edge of the aerodynamic flow surface while the second mount portion comprises leading edge of the aerodynamic flow surface.

13. The system of claim 11, wherein the first mount portion comprises a first connector, the second mount portion comprises a second connector, the first and second connectors mate with one another in an axial direction along the gas turbine combustor, and the first and second connectors define an axial stop.

14. The system of claim 10, wherein the aerodynamic flow surface comprises an airfoil shaped cross-section.

15. The system of claim 10, comprising the gas turbine engine having the turbine combustor liner mount.

16. A method, comprising:
reducing a wake in a wake region downstream from a turbine combustor liner mount along an airflow path between a combustion liner and a flow sleeve of a gas turbine combustor, wherein reducing the wake comprises:
dividing the airflow path into a first flow path and a second flow path via the turbine combustor liner mount;
aerodynamically combining the first and second flow paths into the wake region downstream from the turbine combustor liner mount; and
injecting fuel into the airflow path between the combustion liner and the flow sleeve downstream from the turbine combustor liner mount.

17. The method of claim 16, wherein dividing the airflow path comprises directing the first and second flow paths along opposite curved surfaces of an airfoil shaped geometry of the turbine combustor liner mount.

18. The method of claim 16, wherein the turbine combustor liner mount comprises a first mount portion configured to mate with a second mount portion to define an aerodynamic flow surface, the first mount portion is configured to couple with the combustion liner, and the second mount portion is configured to couple with the flow sleeve.

19. The method of claim 18, wherein the first mount portion comprises a first connector, the second mount portion comprises a second connector, the first and second connectors mate with one another in an axial direction along the gas turbine combustor, and the first and second connectors define an axial stop.

20. The method of claim 16, comprising:
flowing an airflow along the airflow path toward a leading edge of the turbine combustor liner mount; and
flowing the airflow away from a trailing edge of the turbine combustor liner mount, wherein a trailing edge angle of the turbine combustor liner mount is less than a leading edge angle of the turbine combustor liner mount.

* * * * *